(12) United States Patent
Tsai et al.

(10) Patent No.: US 7,824,050 B2
(45) Date of Patent: Nov. 2, 2010

(54) DIFFUSION PLATE AND BACKLIGHT MODULE USING THE SAME

(75) Inventors: Chia-Chang Tsai, Chiayi (TW); Chih-Kang Wu, Jhubei (TW); Chin-Ting Shih, Pusin Township, Changhua County (TW)

(73) Assignee: Au Optronics Corporation, Hsinchu (TW)

(*) Notice: Subject to any disclaimer, the term of this patent is extended or adjusted under 35 U.S.C. 154(b) by 268 days.

(21) Appl. No.: 11/460,342

(22) Filed: Jul. 27, 2006

(65) Prior Publication Data

US 2007/0230210 A1 Oct. 4, 2007

(30) Foreign Application Priority Data

Mar. 30, 2006 (TW) .............................. 95111305 A (51) Int. Cl.
  *G09F 13/08* (2006.01)
  *G09F 13/10* (2006.01)
(52) U.S. Cl. .................. 362/97.4; 362/97.2; 362/330; 362/628
(58) Field of Classification Search .............. 362/330, 362/606–607, 615, 617–618, 628, 94.1–97.4; 349/62–64
See application file for complete search history.

(56) References Cited

U.S. PATENT DOCUMENTS 5,128,781 A * 7/1992 Ohno et al. .................. 349/65

2006/0007367 A1 * 1/2006 Cho .............................. 349/58

FOREIGN PATENT DOCUMENTS

| JP | 04-336527 | 11/1992 |
| JP | 05-257128 | 10/1993 |
| JP | 2001-075490 | 3/2001 |
| TW | 1226951 | 1/2005 |

OTHER PUBLICATIONS

English language translation of relevant parts of TW 1226951, Jan. 21, 2005.
English language translation of relevant parts of 04-336527, Nov. 24, 1992.
English language translation of relevant parts of 2001-075490, Mar. 23, 2001.
English language translation of relevant parts of 05-257128, Aug. 10, 1993.

* cited by examiner

*Primary Examiner*—Jason Moon Han
(74) *Attorney, Agent, or Firm*—Thomas, Kayden, Horstemeyer & Risley (57) ABSTRACT

A diffusion plate and a backlight module for use in a liquid crystal display panel are provided. The backlight module includes a housing, a reflection plate, a light source, a diffusion plate and films. The diffusion plate has a plate body, a first supporter, and a second supporter. The plate body has a light exit surface. The first supporter and the second supporter are respectively disposed on two sides of the plate body and extend outwardly from the light exit surface. The films are disposed on the plate body and between the first and second supporters. The first and second supporters contact and support the liquid crystal display panel.

11 Claims, 8 Drawing Sheets

DIFFUSION PLATE AND BACKLIGHT MODULE USING THE SAME

This application claims benefit to a Taiwanese Patent Application No. 095111305, filed on Mar. 30, 2006.

BACKGROUND OF THE INVENTION

1. Field of the Invention

The present invention relates generally to a diffusion plate and a backlight module using the same. Particularly, the present invention relates to a diffusion plate and a backlight module using the same for use in a liquid crystal display panel.

2. Description of the Prior Art

Backlight modules have been wildly used in liquid crystal displays (LCD), computer keyboards, mobile phone dials, billboards, and many other devices to provided flat light source. In recent years, the market demand of the LCD apparatus explosively grows up. The design in the backlight module of the LCD has been greatly improved to follow the change of the LCD apparatus's various functions and modern appearance.

Figure 1:
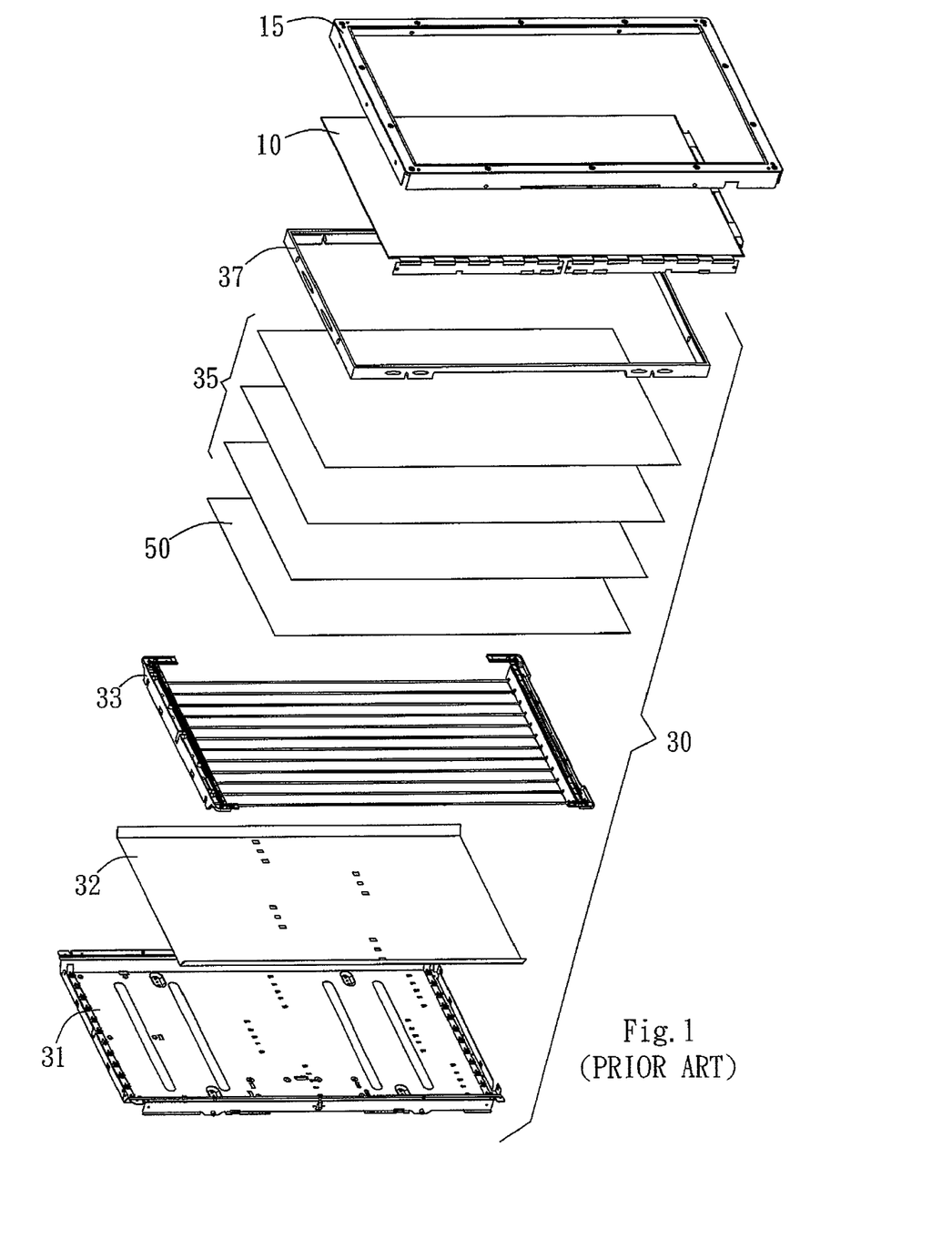
FIG. 1 is an explosive view of a conventional backlight module and liquid crystal display panel.

FIG. 1 shows a conventional backlight module and LCD panel. As illustrated in FIG. 1, the backlight module 30 includes a bottom bezel 31, a reflection plate 32, a light source 33, a diffusion plate 50, films 35, and a top bezel 37. The light source 33 is contained within the bottom bezel 31 while the reflection plate 32 is disposed between the bottom bezel 31 and the light source 33. The diffusion plate 50 and the films 35 are sequentially disposed over the light source 33. The diffusion plate 50 and film 35 are both flat sheet structures and sequentially stacked over the light source 33. The top bezel 37 covers and positions the films 35 and the diffusion plate 50 and connects to the bottom bezel 31.

The LCD panel 10 is disposed on the backlight module 30 and supported by the top bezel 37. The frame 15 covers the LCD panel 10 and the backlight module 30. Since the top bezel 37 has a certain thickness, the presence of the top bezel 37 increases the total thickness of the backlight module 30. In addition, the manufacture process and time are both increased since the top bezel 37 can be assembled only after the diffusion plate 50 and the films 35 are disposed.

SUMMARY OF THE INVENTION

It is an object of the present invention to provide a diffusion plate being able to support a LCD panel.

It is another object of the present invention to provide a diffusion plate for position a film disposed thereon.

It is a further object of the present invention to provide a diffusion plate for reducing the number of the parts in a backlight module.

It is yet another object of the invention to provide a diffusion plate for saving the manufacturing time.

It is yet another object of the present invention to provide a backlight module for reducing the number of the parts in a backlight module.

It is yet another object of the invention to provide a backlight module having shorter manufacturing time.

The present invention achieves these and other objectives by providing a backlight module having a housing, a reflection plate, a light source, a diffusion plate, and a film. The reflection plate and the light source are sequentially disposed within the housing, wherein the light source preferably includes a plurality of lamps. The diffusion plate is disposed over the light source and connects to the housing. The films are disposed on the diffusion plate. A LCD panel is disposed on and supported by the backlight module.

The diffusion plate includes a plate body having a first supporter and a second supporter. The plate body includes a first edge, a second edge, and a light exit surface between the first edge and the second edge. The light exit surface also includes a light emitting area. The first supporter and the second supporter are respectively disposed on sides corresponding to the first edge and the second edge and extending from the first and second edges respectively. The first supporter and the second supporter are respectively distributed along the boundary of the light emitting area. The films are disposed on the plate body and between the first supporter and the second supporter. The first supporter and the second supporter are in contact with and support the LCD panel.

In a preferred embodiment, the first supporter and the second supporter respectively outwardly extend to form a housing connecter. The housing connecter connects to a top surface of the side wall of the housing. In addition, the first supporter and the second supporter inwardly extend to form film positioning units respectively. The films disposed on the light exit surface insert into the space between the film position unit and the plate body to restrict the movement of the films.

DETAILED DESCRIPTION OF THE PREFERRED EMBODIMENT

The present invention provides a diffusion plate and a backlight module using the diffusion plate. In a preferred embodiment, the backlight module is provided for use in a liquid crystal display (LCD) panel. In another embodiments however, the backlight module may be provided for use with computer keyboards, mobile phone dials, billboards, and other devices needing flat light source. In a preferred embodiment, the backlight module of the present invention provides the LCD panel with flat backlight.

Figure 2:
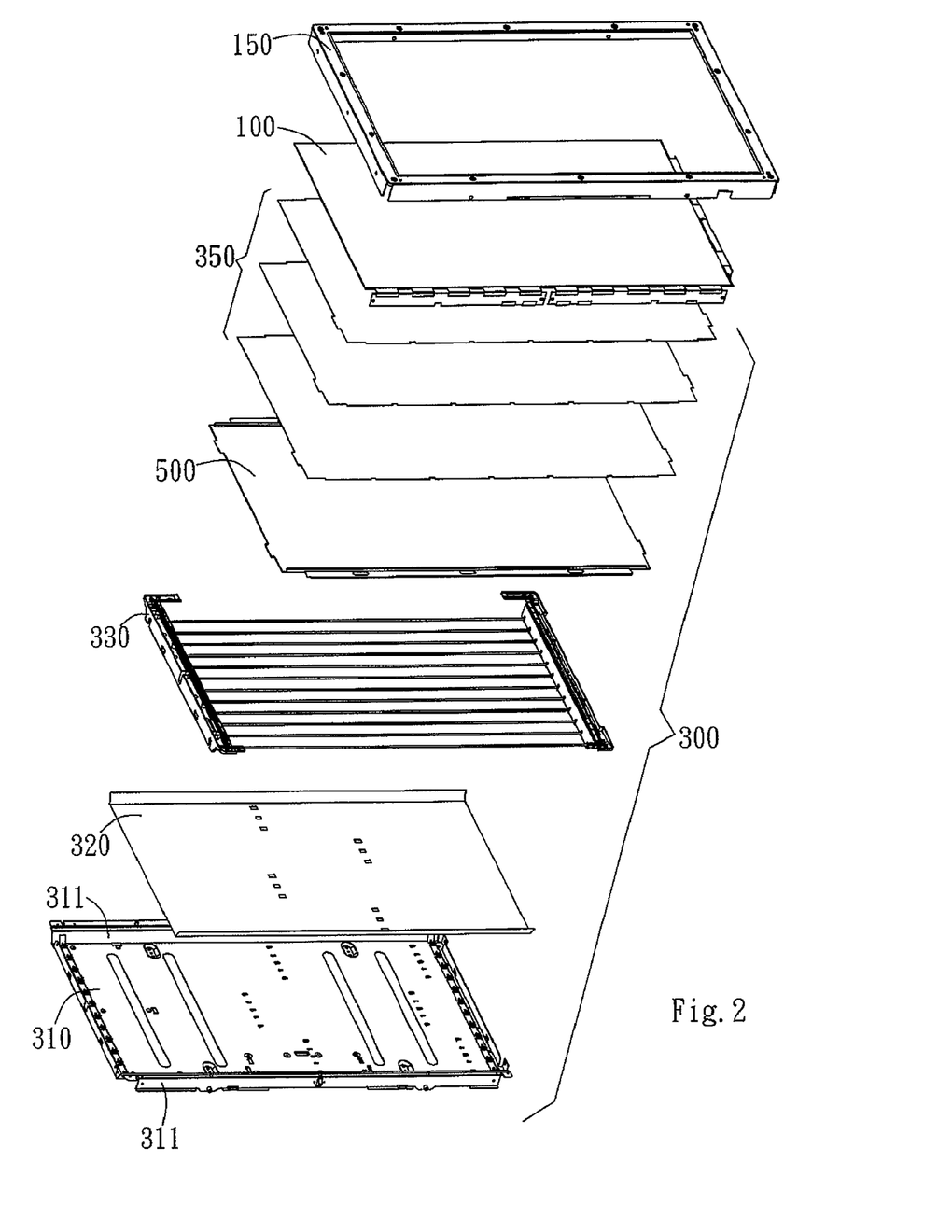
FIG. 2 is an explosive view showing an embodiment of the backlight module and the liquid crystal display panel according to the present invention.

In an embodiment shown in FIG. 2, the backlight module 300 includes a housing 310, a reflection plate 320, a light source 330, a diffusion plate 500, and films 350. The housing 310 serves the function as a base of the backlight module 300. In a preferred embodiment, the housing 310 is made of metal; in another embodiment, however, the housing 310 may be made of high strength plastic.

As illustrated in FIG. 2, the housing 310 has side walls 311. The reflection plate 320 and the light source 330 are sequentially disposed within the housing 310 and between side walls 311. The light source 330 preferably includes a plurality of parallel lamps. In another embodiment, however, the light source 330 may include a single lamp disposed on a side of the backlight module or an L-shaped lamp. The lamp mentioned here includes cold cathode fluorescent lamp (CCFL), external electrode fluorescent lamp (EEFL), light emitting diode (LED), or other different light source.

The diffusion plate 500 is disposed over the light source 330 and connects to the housing 310. In a preferred embodiment, the diffusion plate 500 connects to a top surface of the side wall 311 of the housing 310. The connection may be achieved by using screws, adhesive, latches, or other similar structure. The films 350 are disposed on the diffusion plate 500. The films 350 preferably include optical films such as brightness enhancement films (BEF) and polarizing films.

A LCD panel 100 and frame 150 are disposed on the backlight module 300. The light emitted from the light source 330 passes through the diffusion plate 500 and films 350 and reaches the LCD panel 100. The LCD panel 100 preferably includes a color LCD panel; however, the LCD panel 100 may also include a self-color LCD panel in other embodiments.

Figure 3:
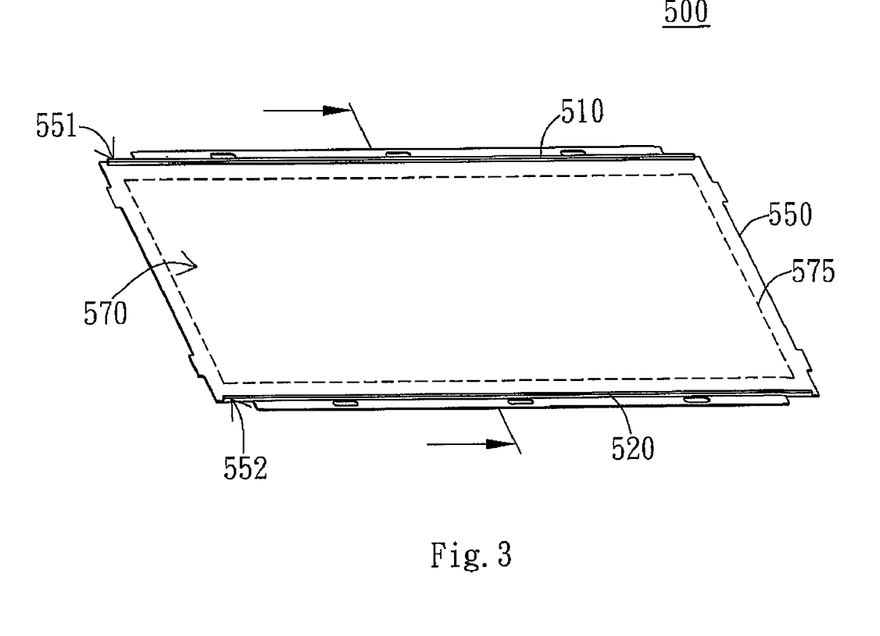
FIG. 3 is a perspective view of an embodiment of the diffusion plate according to the present invention.

FIG. 3 illustrates an embodiment of the diffusion plate 500. As FIG. 3 shows, the diffusion plate 500 includes a plate body 550, a first supporter 510, and a second supporter 520. The diffusion plate is provided to diffuse and uniform the light emitted from the light source 330. In a preferred embodiment, the diffusion plate 500 may also enhance the brightness of the light in an orthogonal direction.

The plate body 550 preferably includes a light-transmissible plate containing a plurality of particles. In addition, in a preferred embodiment, the plate body 550 has an optical micro structure on its surface to improve the diffusion effect and uniformity of light. As shown in FIG. 3, the plate body 550 includes a first edge 551, a second edge 552, and a light exit surface between the first edge 551 and the second edge 552. Preferably, the light exit surface 570 is the surface of the plate body 550 facing to the LCD panel 100; i.e., the surface opposite to the light source 330. In a preferred embodiment, the first edge 551 and the second edge 552 are opposite to each other. Preferably, the first edge 551 and the second edge 552 are two corresponding long side of a rectangular plate body 550.

Figure 4:
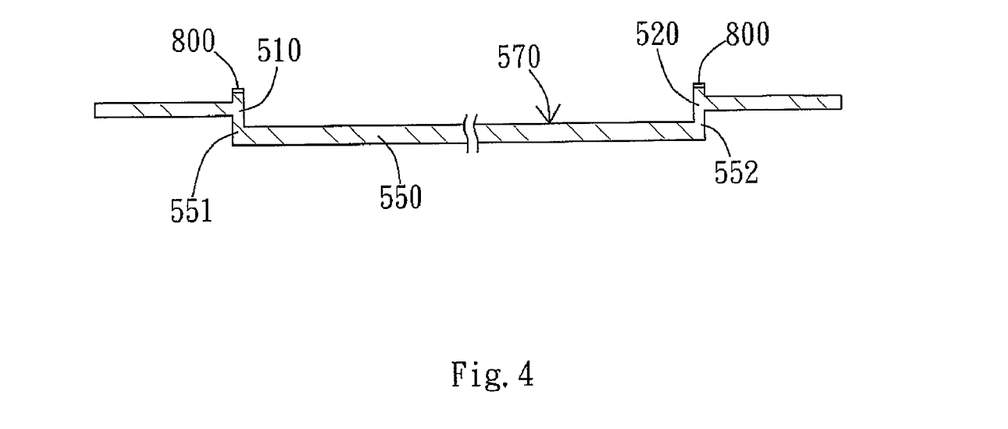
FIG. 4 is a cross-sectional view of the embodiment shown in FIG. 3.

As FIG. 3 shows, the first supporter 510 and the second supporter 520 are respectively disposed on sides corresponding to the first edge 551 and the second edge 552. The cross-sectional view of FIG. 4 illustrates that the first supporter 510 and the second supporter 520 are respectively extending from the first edge 551 and the second edge 552. In the embodiment shown in FIG. 3 and FIG. 4, both the first supporter 510 and the second supporter 520 are shaped in long strips and vertically extend from the plate body 550. In another embodiment, however, the first supporter 510 and the second supporter 520 may have different sectional shapes and intersect the plate body 550 with different angles. In addition, the first supporter 510, the second supporter 520 and the plate body 550 are integratedly formed. In another embodiment, however, the first supporter 510 and the second supporter 520 may be independently formed and attached to the plate body 550 afterward. Please note that the first supporter 510 and the second supporter 520 are preferably having similar forming process and arrangement. However, the first supporter 510 and the second supporter 520 may have different forming process and arrangement under different design or other consideration.

Figure 5:
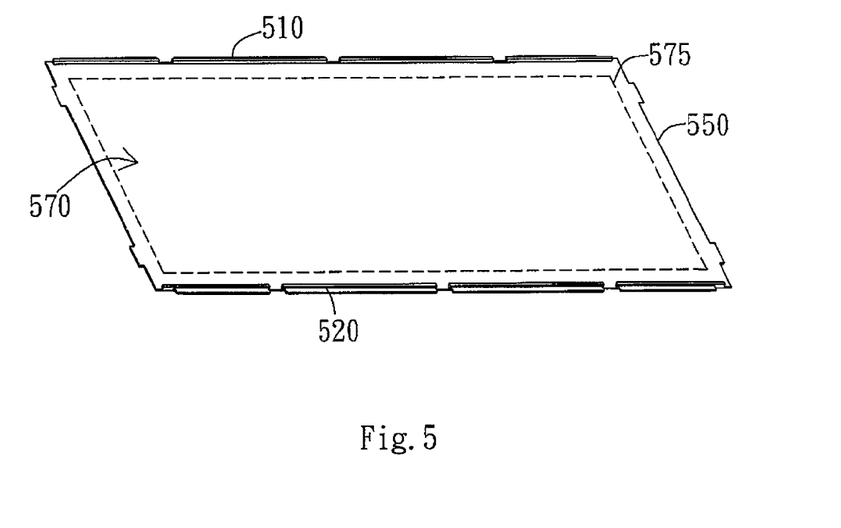
FIG. 5 shows another embodiment of the diffusion plate according to the present invention.

As illustrated in FIG. 3, the light exit surface 570 includes a light emitting area 575 which allows the light within the diffusion plate 500 passes through. The light emitting area 575 is between the first supporter 510 and the second supporter 520. The first supporter 510 and the second supporter 520 are respectively distributed along the boundary of the light emitting area 575. In this embodiment, the first supporter 510 and the second supporter 520 may be respectively shorter than or equal to the sides of the diffusing plate body 550. The first supporter 510 and the second supporter 520 may respectively include a single continuous supporter unit along the first edge 511 of the diffusing plate body 550, as FIG. 3 shows, or respectively include a plurality of discontinuous supporter units along the first edge 511 of the diffusing plate body 550, as FIG. 5 shows. In addition, in the embodiments of FIG. 3 and FIG. 5, the first supporter 510 and the second supporter 520 are symmetrical with respect to the diffusing plate body 550. In another embodiment, however, the first supporter 510 and the second supporter 520 may be asymmetrically disposed.

Figure 6:
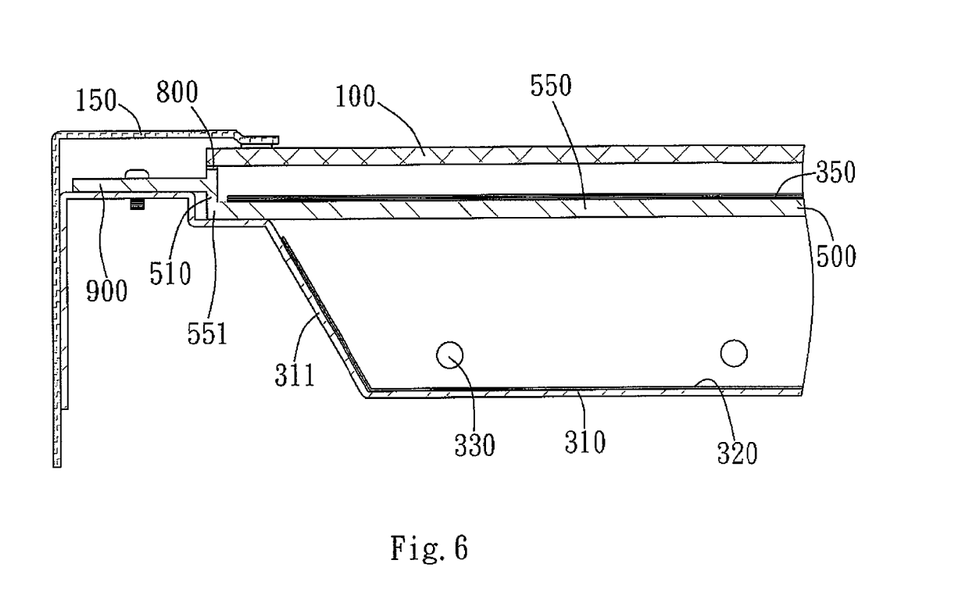
FIG. 6 is a cross-sectional view showing an embodiment of the assembled backlight module and liquid crystal display panel.

As FIG. 6 shows, the films 350 are disposed on the plate body 550 and between the first supporter 510 and the second supporter 520. The first supporter 510 and the second supporter 520 are in contact with and support the LCD panel 100. In this embodiment, the first supporter 510 and the second supporter 520 respectively have a cushion portion 800 attached thereon, which means that the first supporter 510 and the second supporter 520 contact the LCD panel 100 via the cushion portion 800. When an external force is exerted on the backlight module 300 or the LCD panel 100, the cushion portion 800 is able to reduce the damage resulted from the contact between the first supporter 510, the second supporter 520 and LCD panel 100. The cushion portion 800 is preferably made of shock-absorbing rubber, foam plastic, or other similar elastic materials.

In the embodiment shown in FIG. 6, the bottom of the first supporter 510 and the second supporter 520 respectively outwardly extend to form a housing connecter 900. The housing connecter 900 outwardly extends from a middle part of the first supporter 510 and is parallel to the plate body 550. The housing connecter 900, the first supporter 510, and the plate body 550 are preferably integratedly formed. However, in another embodiment, the housing connecter 900 may be independently formed and coupled to the first supporter 510 afterward.

Figure 7A:
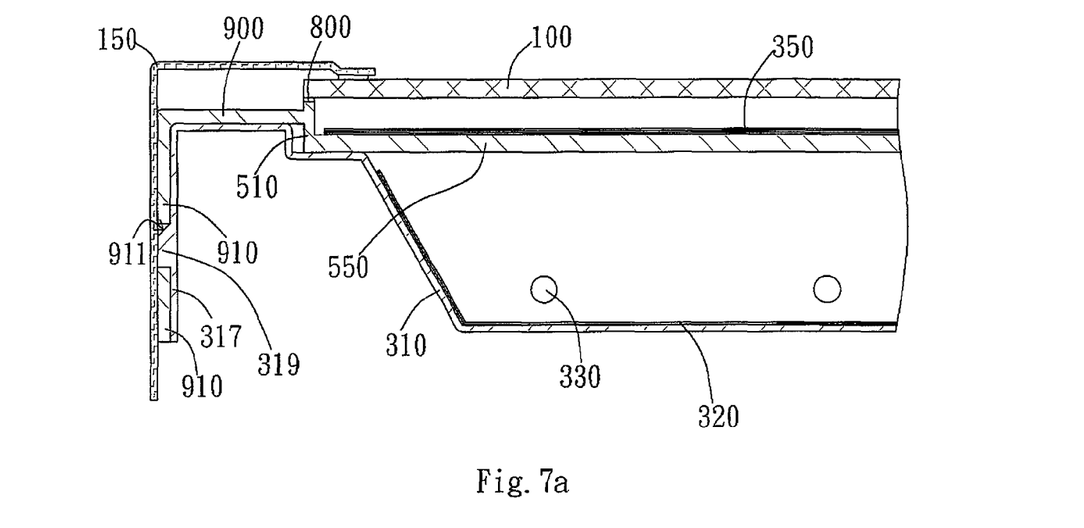
FIG. 7a is a cross-sectional view of another embodiment of a backlight module and a liquid crystal display panel according to the present invention.
Figure 7B:
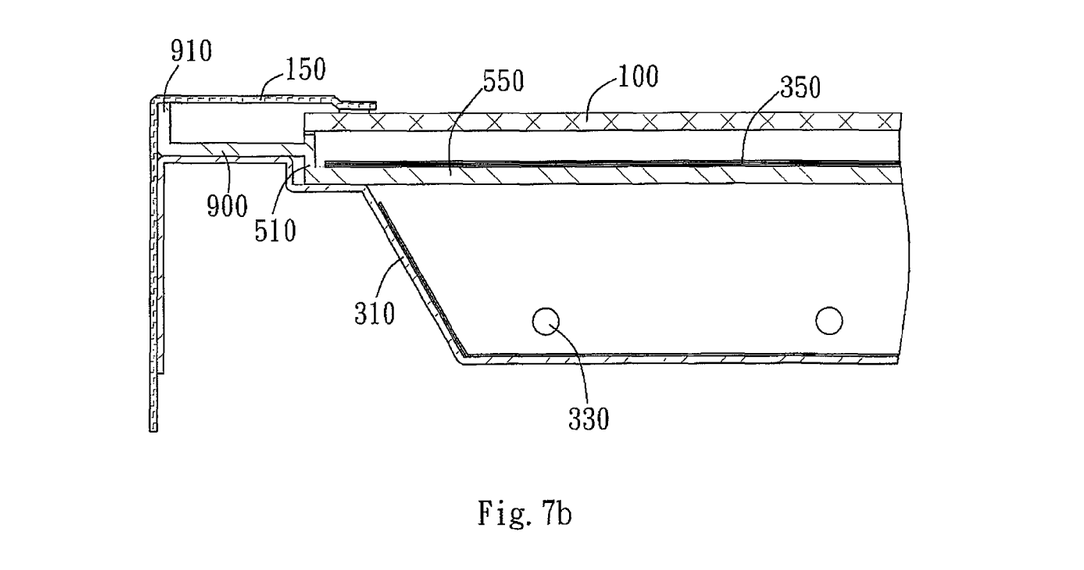
FIG. 7b is a cross-sectional view of another embodiment of a backlight module and a liquid crystal display panel according to the present invention.

As FIG. 6 shows, the housing connecter 900 connects to a top surface of the side wall of the housing 310. The top surface mentioned-above includes a flank border, which parallel to the plate body 550. The connection may be achieved by screws, adhesive, or latches. In the present embodiment, the first supporter 510 preferably protrudes from the surface of the housing connecter 900 and the plate body 550. In the embodiment shown in FIG. 7a, the housing connecter 900 outwardly extends from the first supporter 510 and further downwardly bends to form a bending portion 910. The bending portion 910 is coupled to an outer wall 317 of the housing 310. The bending portion 910 has a hole 911 while the outer wall 317 has a protrusion 319 corresponding to the hole 911. The protrusion is retained in the hole 911 to maintain the engagement. In another embodiment, however, the arrangement of the hole 911 and the protrusion 319 may be reversed; i.e., the protrusion is disposed on the bending portion 910, and the hole 911 is formed on the outer wall. In addition, screws and adhesive may be used to make the connection. In the embodiment shown in FIG. 7b, the bending portion 910 is made by upwardly bending the housing connecter 900. The bending portion 910 may also serve the function as a retaining portion to resist a pressure inwardly exerted by the frame 150.

Figure 8A:
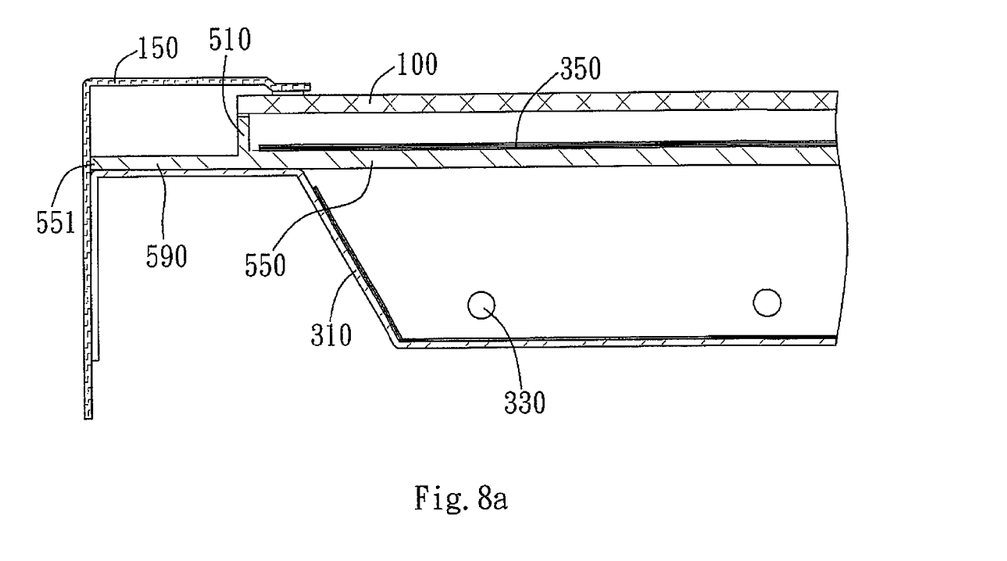
FIG. 8a is a cross-sectional view of another embodiment of a backlight module and a liquid crystal display panel according to the present invention.
Figure 8B:
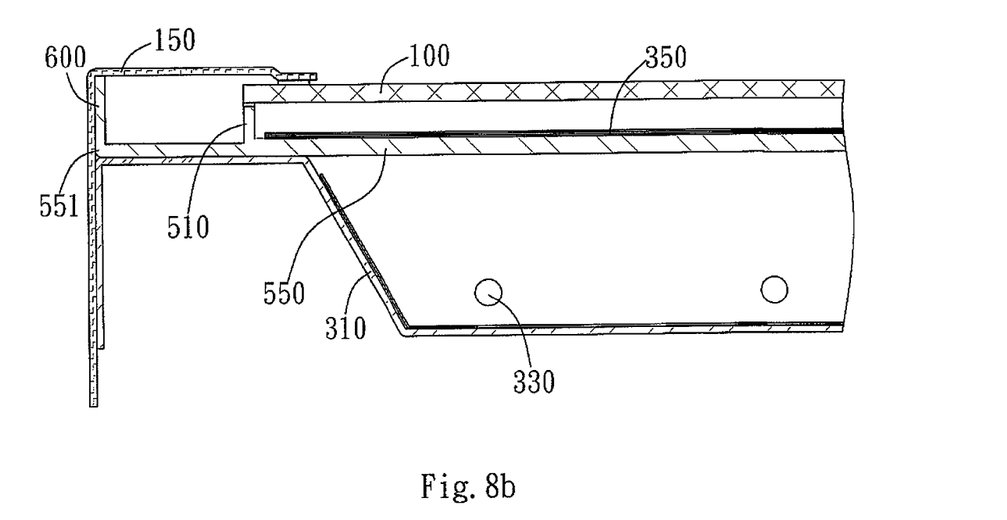
FIG. 8b is a cross-sectional view of another embodiment of a backlight module and a liquid crystal display panel according to the present invention.

In the embodiment shown in FIG. 6, the first supporter 510 directly connects to the first edge 551. In another embodiment shown in FIG. 8a, however, an interval portion 590 may exist between the first supporter 510 and the first edge 551. In other words, the interval portion 590 is outwardly extended from a bottom end of the first supporter 510. In this embodiment, the interval 590 may be used to connect the housing 310. In another embodiment shown in FIG. 8b, the first edge 551 may also extend upright to form the retaining portion 600 to resist the inward pressure.

Figure 8C:
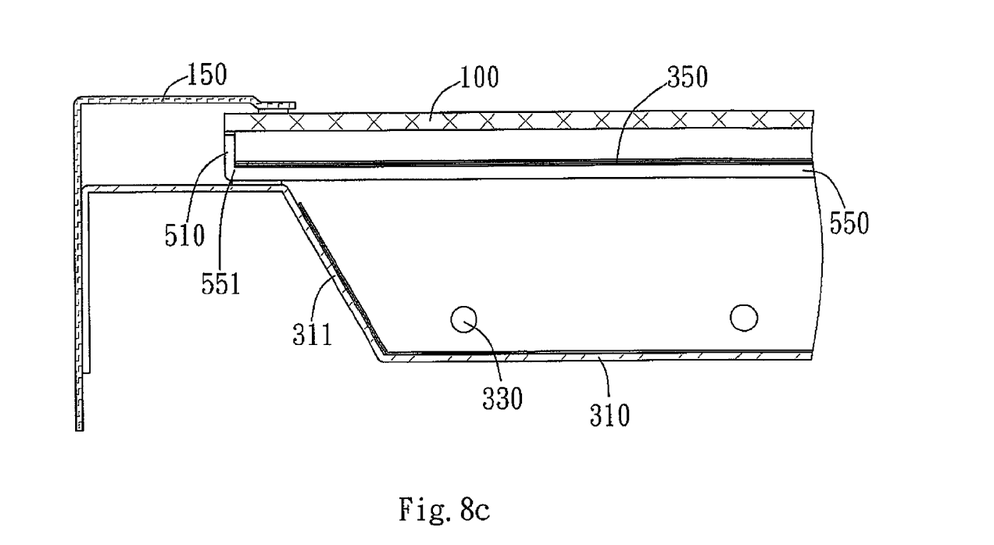
FIG. 8c is a cross-sectional view of another embodiment of a backlight module and a liquid crystal display panel according to the present invention.

FIG. 8c illustrates another embodiment of the present invention. In this embodiment, when the first supporter 510 directly connects to the first edge 551, the bottom surface of the plate body 550 connects to the top surface of the housing's 310 side wall 311. In this embodiment, a twin adhesive is mostly preferred to be used to connect the plate body 550 with the top surface of the side wall 311.

Figure 9:
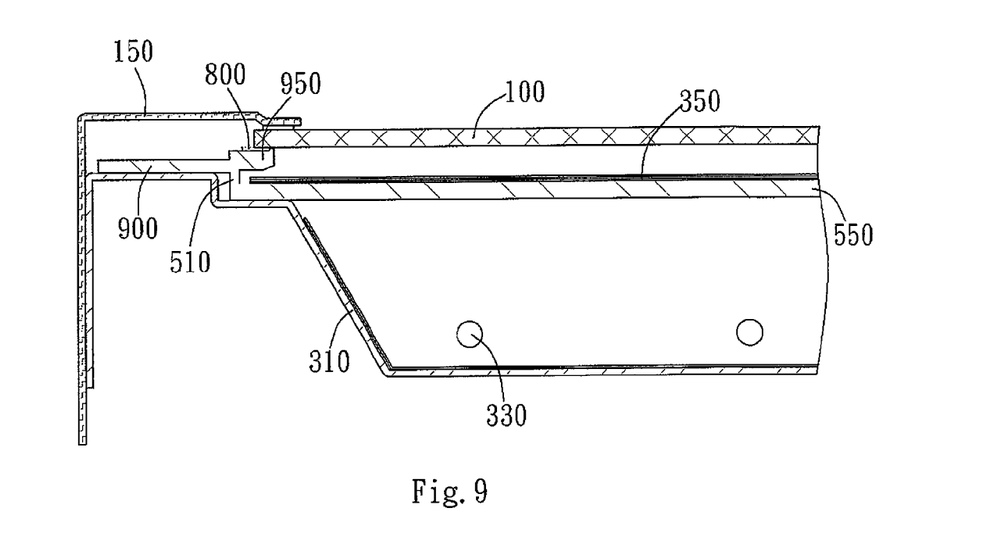
FIG. 9 is a cross-sectional view showing an embodiment of diffusion plate including the film position unit according to the present invention.

In an embodiment shown in FIG. 9, the diffusion plate 500 further includes film positioning units 950. The film positioning units 950 are respectively inwardly extending from the first supporter 510 and the second supporter 520. The edges of the films 350 disposed on the light exit surface 570 insert into the space between the film positioning unit 950 and the plate body 550 to restrict the movement of the films 350. In addition, the edges of the films 350 may be modified in accordance with the distribution of the film position unit 950 to form an uneven edge. The film position unit 950 is preferably parallel to the light exit surface 570. In another embodiment, however, the film positioning unit 950 may also intersect the light exit surface 570 with different angle.

As illustrated in FIG. 9, the first supporter 510 and the second supporter 520 are respectively inwardly bended to form the film positioning units 950. In another embodiment, however, the film positioning unit 950 may be inwardly extended from a middle part of the first supporter 510 or the second supporter 520. The film positioning unit 950 is preferably formed integrate with the first supporter 510 or the second supporter 520. However, in another embodiment, the film positioning unit 950 may be additionally attached to the first supporter 510 or the second supporter 520.

Figure 10:
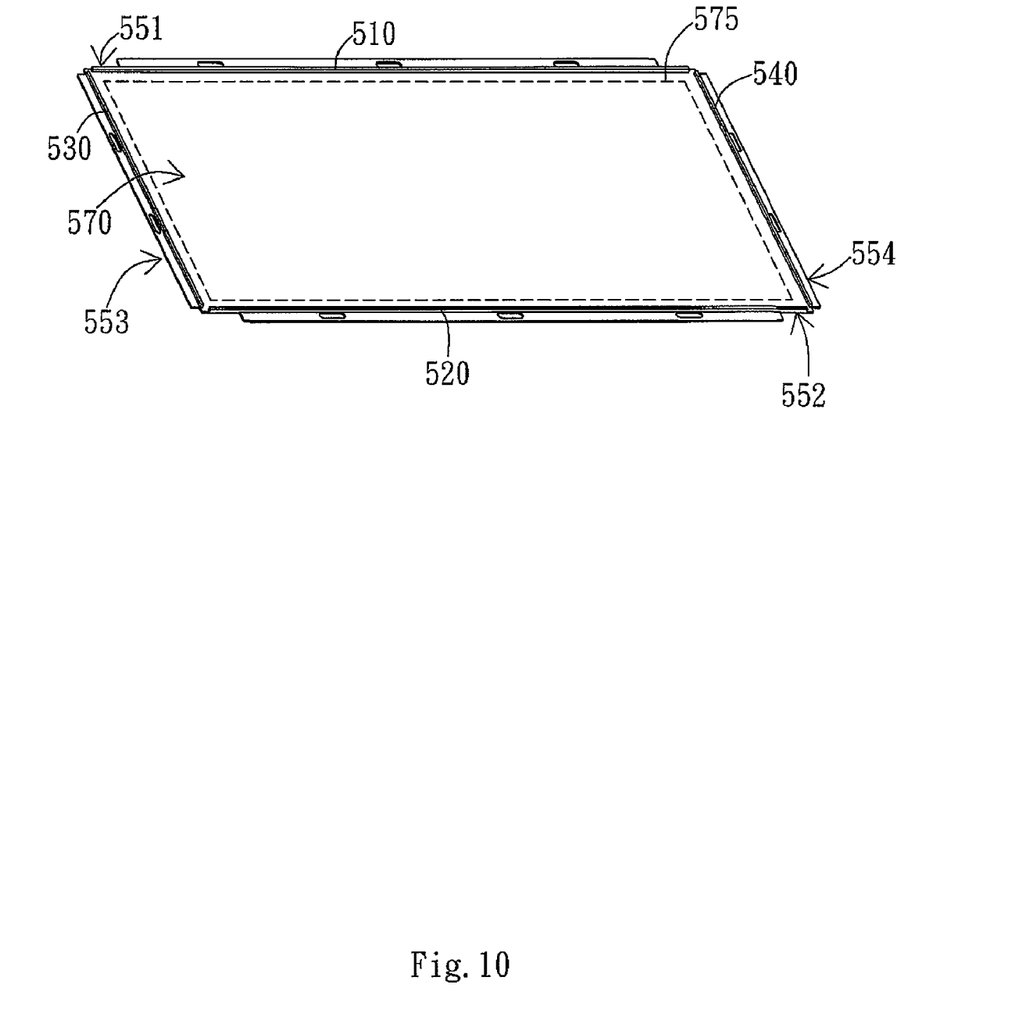
FIG. 10 shows another embodiment of the diffusion plate according to the present invention.

In an embodiment shown in FIG. 10, the plate body 550 is shaped in rectangular. The first edge 551 and the second edge 552 are the opposite long sides of the plate body 550 while the third edge 553 and the fourth edge 554 are the opposite short sides of the plate body 550. In other words, the first edge 551, the second edge 552, the third edge 553, and the fourth edge 554 form the four sides of the rectangular plate body 550.

As FIG. 10 shows, the diffusion plate 500 further includes a third supporter 530 and a fourth supporter 540. The third supporter 530 and the supporter 540 are respectively disposed on sides of the third edge 553 and the fourth edge 554. The third supporter 530 and the fourth supporter 540 preferably extend from the third edge 553 and the fourth edge 554 respectively. The light emitting area 575 is among the first supporter 510, the second supporter 520, the third supporter 530, and the fourth supporter 540.

In this preferred embodiment, the third supporter 530 and the fourth supporter 540 are symmetrically disposed. In another embodiment, however, the third supporter 530 and the fourth supporter 540 may be asymmetrically disposed as well. In addition, the third supporter 530 and the fourth supporter 540 are preferably having similar forming process and arrangement. However, the third supporter 530 and the fourth supporter 540 may have different forming process and arrangement under different design or other consideration.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A backlight module, comprising:
   a housing having a flank border;
   a plurality of light sources disposed within the housing;
   a diffusion plate disposed over the light sources and connected to the housing, the diffusion plate comprising a diffusing plate body having a first supporter and a second supporter, wherein the first supporter extends from a first edge of the diffusing plate body, and the second supporter extends from a second edge opposite to the first edge of the diffusing plate body, the diffusion plate further includes a housing connecter extending from the bottom of the first supporter parallel to the diffusing plate body and the flank border, the first supporter protrudes from the surface of the housing connecter and the plate body, wherein the plurality of light sources are distributed under the diffusion plate body from the first edge to the second edge; and
   a film disposed on the diffusion plate and located between the first supporter and the second supporter.

2. The backlight module of claim 1, wherein the first supporter and the second supporter are symmetrical with respect to the diffusing plate body.

3. The backlight module of claim 1, wherein the first supporter includes a plurality of discontinuous supporter units sequentially aligned in a line along the first edge of the diffusing plate body.

4. The backlight module of claim 1 further comprising a retaining portion disposed outside the first supporter and parallel to the first supporter, wherein the retaining portion is substantially perpendicular to the diffusing plate body.

5. The backlight module of claim 1, wherein the housing connecter includes a bending portion connecting to an outer wall of the housing.

6. The backlight module of claim 1, wherein the first supporter has a cushion portion attached thereon.

7. The backlight module of claim 1, further comprising at least one film disposed on the diffusing plate body, wherein the first supporter has a film positioning portion inwardly extending therefrom, the film inserts into a space between the film positioning portion and the diffusing plate body.

8. The backlight module of claim 7, wherein the first supporter is inwardly bended to form the film positioning portion.

9. The backlight module of claim 1, wherein the plate body further has a third supporter and a fourth supporter, wherein the third supporter extends from a third edge of the diffusing plate body, and the fourth supporter extends from a fourth edge opposite to the third edge of the diffusing plate body, wherein the third edge and the fourth edge further extend outwardly from the third supporter and the fourth supporter, respectively.

10. The backlight module of claim 9, wherein the third supporter and the fourth supporter are symmetrical with respect to the diffusing plate body.

11. The backlight module of claim 5, wherein the bending portion is made by upwardly bending the housing connecter and extends away from the flank border of the housing.

* * * * *